June 10, 1958 F. R. HARDI 2,838,599
METHOD AND DEVICE FOR ENGRAVING PLATES AND PLATES
MANUFACTURED BY SUCH METHODS
Filed June 24, 1955 3 Sheets-Sheet 1

INVENTOR
FRITS RUDOLF HARDI

BY Fred M. Vogel
AGENT

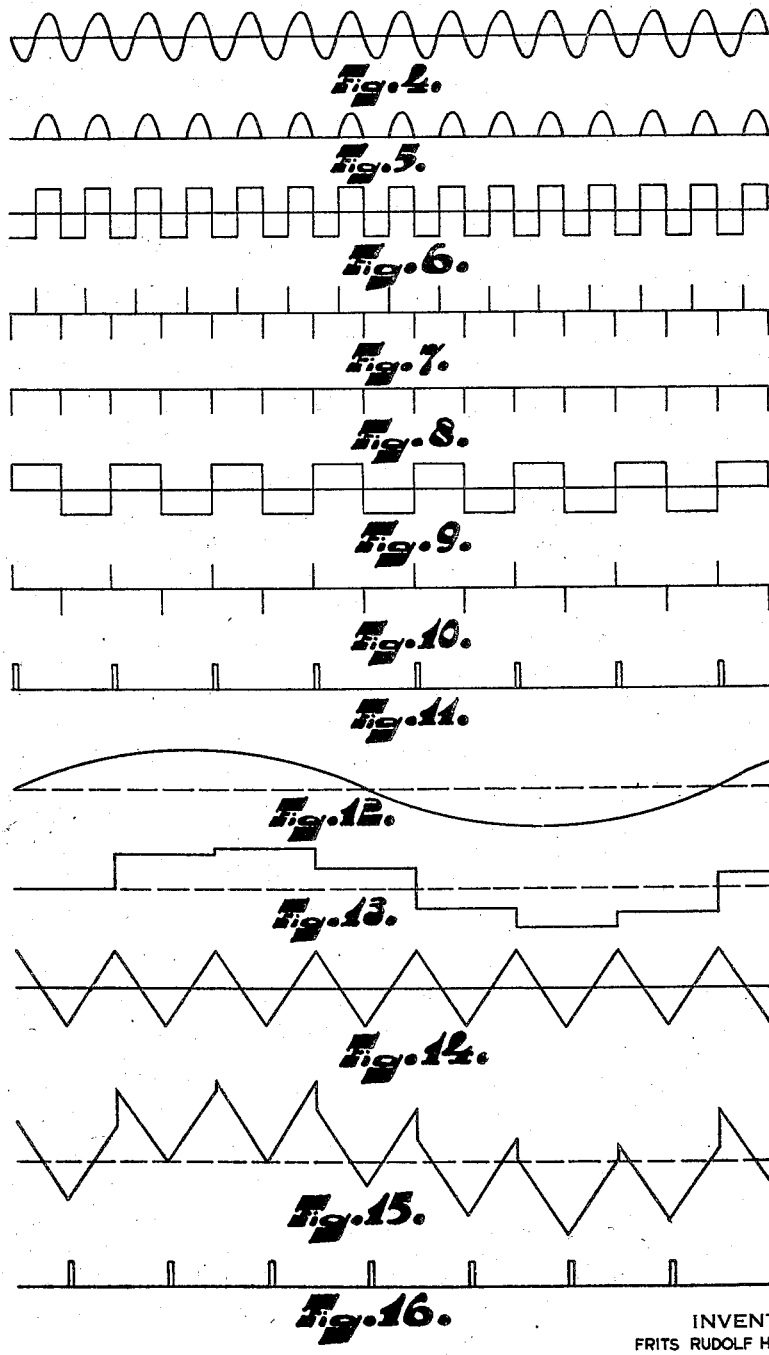

INVENTOR
FRITS RUDOLF HARDI

BY Fred M. Vogel
AGENT

United States Patent Office 2,838,599
Patented June 10, 1958

2,838,599

METHOD AND DEVICE FOR ENGRAVING PLATES AND PLATES MANUFACTURED BY SUCH METHODS

Frits Rudolf Hardi, Eindhoven, Netherlands, assignor, by mesne assignments, to North American Philips Company, Inc., New York, N. Y., a corporation of Delaware Application June 24, 1955, Serial No. 517,784

Claims priority, application Netherlands July 1, 1954

4 Claims. (Cl. 178—6.6)

The present invention relates to apparatus for engraving a body of material in accordance with a predetermined pattern. More particularly, the invention relates to methods of engraving plates in accordance with a predetermined pattern with the use of a chisel in such manner that the penetration depth of the chisel varies as a function of the amplitude of an electrical modulating voltage corresponding to the pattern, the movement of the chisel exhibiting a determined fundamental frequency.

Methods and devices of the above-mentioned kind are already known in which the chisel is moved by mechanical means. The object of the invention is to provide a method and a device in which the movement of the chisel is controlled by electronic means.

It is noted that more particularly in the manufacture of blocks it is necessary that the sequential points of maximum depth of penetration of the chisel into the plate to be engraved shall be equally spaced, measured along the surface of the plate. Furthermore, it is necessary for the speed of the chisel at right angles to the surface of the plate to be always constant both upon penetrating the plate and upon withdrawing therefrom.

In accordance with the method of the invention which satisfies the above-mentioned requirements, a first triangular voltage of the half fundamental frequency is produced, the electrical modulating voltage has derived from it a first stepwise voltage, the amplitude of which assumes the amplitude of the electrical modulating voltage which occurs at each peak of the first triangular voltage, and the first triangular voltage and the first stepwise voltage are added into a first sum voltage. A second triangular voltage of the half fundamental frequency is produced, which is shifted in phase by 180° with respect to the first triangular voltage, the electrical modulating voltage has derived from it a second stepwise voltage, the amplitude of which assumes the amplitude of the electrical modulating voltage which occurs at each peak of the second triangular voltage, and the second triangular voltage and the second stepwise voltage are added into a second sum voltage. The first and second sum voltages are subsequently supplied to an electronic switch, the output voltage of which controls the movement of the chisel, the electronic switch being controlled by a third sum voltage obtained by addition of the first and second stepwise voltages and of which the amplitude is so chosen that at moments in which the amplitudes of the first and second sum voltages have the same value, it also has the same value.

In order that the invention may be readily carried into effect, it will now be decribed, by way of example, with reference to the accompanying drawings, wherein:

Figs. 4 to 21, inclusive, are waveform diagrams which serve to explain more fully the operation of the circuit arrangement of Fig. 3, the same time-axis being used for Figs. 4 through 21.

Figure 1:
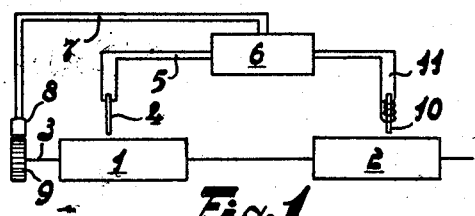
Fig. 1 is a schematic block diagram of an embodiment of the device to which the invention is applied.

In the device shown in Fig. 1, the original object, of which a block is to be manufactured, is secured in known manner to a cylindrical drum 1. The plate to be engraved is provided on a cylindrical drum 2. The two drums are coupled together in known manner, so that when an axis 3 is driven they rotate about the axis in the same sense and at the same speed and perform opposite translations along the axis, thus moving towards one another and away from one another at the same speed of translation.

The original object on the drum 1 has derived from it, with the use of a device 4, an electrical modulating voltage which varies in accordance with the blackening of the original. For this purpose the device 4 may comprise, for example, a light source by which the original is irradiated and a photo-electric cell on which the reflected light is collected. The resultant electrical modulating voltage is supplied by way of conductors 5 to a device 6. The device 6 has also supplied to it, via conductors 7, an electrical oscillation, provided by a device 8, which is in harmonic relationship with the rotational speed of the shaft 3 and is derived therefrom in known manner, for example, via a gear wheel 9 seated on the shaft 3. The frequency of said oscillation is chosen to be equal to the desired fundamental frequency of a chisel 10 by which the plate on the drum 2 is engraved. The vertical movement of the chisel 10 is controlled by electromagnetic means via conductors 11 by means of the output voltage of the device 6.

Figures 2A, 2B:
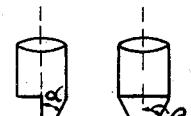
Figs. 2a and 2b are schematic diagrams of two relatively perpendicular sections of the chisel 10 of the embodiment of Fig. 1.

Figs. 2a and 2b are two sectional views of the chisel 10, the sectional view of Fig. 2a coinciding with the plane of drawing of Fig. 1 and Fig. 2b being the sectional view in a plane at right angles to the plane of drawing. The shape of the chisel will be referred to later.

Figure 3:
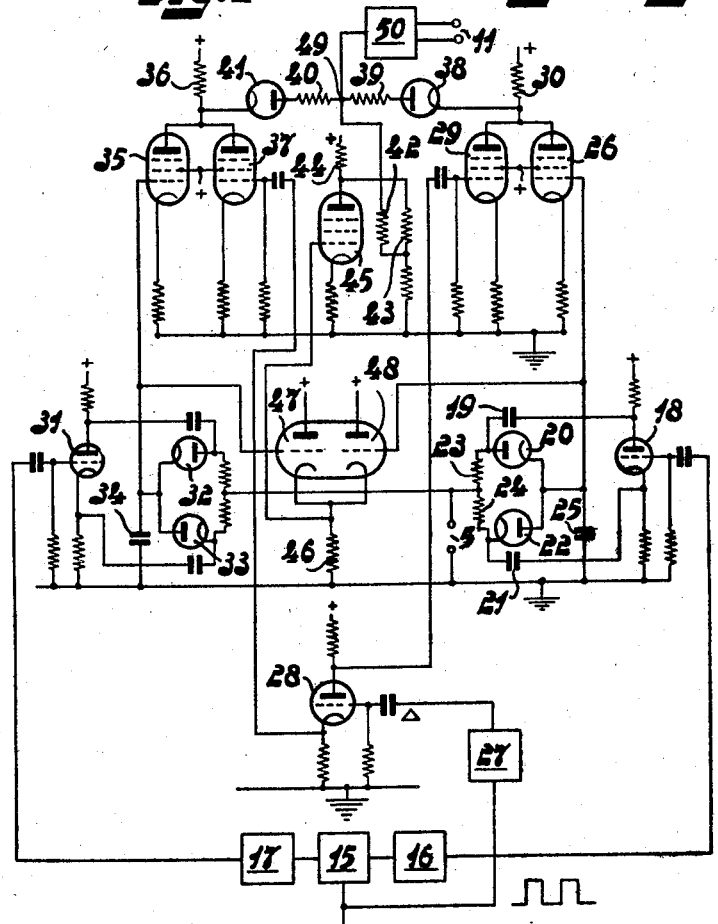
Fig. 3 is a schematic diagram, partially in block form, of an embodiment of the circuit arrangement of the block 6 of the device of Fig. 1.

Fig. 3 shows the circuit arrangement of the block 6 of the device of Fig. 1. The conductors 7 of Fig. 1, through which the sinusoidal oscillation of Fig. 4 is supplied to the block 6 at a frequency equal to the fundamental frequency of the movement of the chisel, are connected to a device 12 of otherwise known kind, in which said oscillation is subjected to half-wave rectification, resulting in the voltage shown in Fig. 5. This voltage is converted in device 12 in a known manner into a pulsatory voltage as shown in Fig. 6. Said voltage is supplied to a device 13, in which it is differentiated, resulting in the voltage shown in Fig. 7. Subsequently, the positive voltage pulses are suppressed and the negative voltage pulses shown in Fig. 8 are supplied as synchronizing pulses to a bistable multivibrator 14 also of known kind. The output voltage of the bistable multivibrator which is shown in Fig. 9, is differentiated in a device 15 providing an output voltage as shown in Fig. 10.

The positive pulses of the voltage shown in Fig. 10 are supplied to a monostable multivibrator 16 which provides short rectangular pulses indicated with positive polarity in Fig. 11, but occurring with negative polarity. The negative pulses of the voltage shown in Fig. 10 are supplied to a monostable multivibrator 17 which provides short rectangular pulses, likewise with negative polarity, but shown with positive polarity in Fig. 16, which are shifted in phase by 180° with respect to the pulses shown in Fig. 11.

The output voltage of opposite polarity in Fig. 11 of the monostable multivibrator 16 is supplied to the control grid of a phase-inverting tube 18. Pulses which are equal but oppositely directed, which occur at the anode and cathode resistors of the tube, are supplied to a clamper of known kind. The electrical modulating voltage derived from the device 4 of Fig. 1 is also supplied via the conductors 5 to said clamper. The modulating voltage has a shape as shown, for example, in Fig. 12.

The positive pulses occurring at the anode of tube 18 are supplied via a capacitor 19 to the anode of a diode 20. The negative pulses occurring at the cathode of tube 18 are supplied by way of a capacitor 21 to the cathode of a diode 22. The anode of diode 20 is connected via the series-combination of two equivalent resistors 23 and 24 to the cathode of diode 22, whereas the cathode of diode 20 is connected to the anode of diode 22. One of the conductors 5 is connected to the junction point of the resistors 23 and 24, the other conductor being connected to one electrode of a capacitor 25, the other electrode of which is connected to the cathode of diode 20 and the anode of diode 22. When pulses occur at the output circuit of tube 18, the diodes 20 and 22 become conductive and the capacitor 25 is charged or discharged to a voltage corresponding to the then occurring amplitude of the modulating voltage of Fig. 12 supplied via the conductors 5. Said voltage across the capacitor remains substantially constant till the subsequent occurrence of pulses, the voltage changing to the value of the non-occurring amplitude of the modulating voltage. A first stepwise voltage of the shape shown in Fig. 13 thus occurs across capacitor 25, said voltage being supplied to the control-grid circuit of a tube 26.

Figure 17:
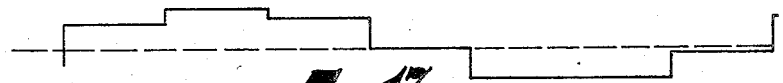
Figure 18:
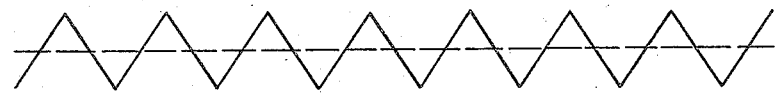

Referring to the output voltage in Fig. 9 of the bistable multivibrator 14, it may be seen from Fig. 3 that this voltage is also applied to a device 27. The device 27 is designed in known manner as an integrator and provides a triangular voltage which is supplied to the control-grid circuit of a phase-inverting tube 28. A first triangular voltage of the shape shown in Fig. 14 occurs across the anode circuit of tube 28 and a second triangular voltage shifted in phase by 180° as shown in Fig. 18 occurs across the cathode circuit. The output voltage on the anode, i. e. that shown in Fig. 14, is applied to the control-grid circuit of a tube 29. The tubes 26 and 29 have a common anode resistor 30, so that their output voltages are added. The output voltage of tube 26 corresponds to the input voltage of Fig. 13 except for the phase inversion, the output voltage of tube 29 corresponding to the input voltage of Fig. 14, likewise except for the phase inversion. In order to prevent unnecessary complication of the review of Figs. 13 to 21, the phase inversion is not shown in said figures. Set up across the common anode resistor 30 of the tubes 26 and 29 is a voltage which, apart from the voltage amplification of the tubes, is equal to the sum of the voltages of Figs. 13, 14 and which is shown in Fig. 15. It appears from Fig. 15 that, with the first sum voltage, the amplitude varies exactly by an amount determined by the modulating voltage each time a peak of the first triangular voltage occurs.

A second sum voltage is obtained in an analogous manner by means of the output voltage of the monostable multivibrator 17 supplied with a polarity opposite to that shown in Fig. 16 to the control-grid circuit of a phase-inverting tube 31, the anode and cathode of which have derived from them pulsatory voltages for controlling a second clamper comprising diodes 32 and 33. The electric modulating signal is likewise supplied to the said device via the conductors 5. The second stepwise output voltage is set up across a capacitor 34 and is shown in Fig. 17. As may appear from a comparison between Figs. 13 and 17, the output voltages of the two clampers are not equal, which is attributable to the fact that the series of pulses shown in Figs. 11 and 16, which control the said clampers, differ relatively in phase by 180°.

The second stepwise voltage across capacitor 34 is supplied to the control-grid circuit of a tube 35. The anode resistor 36 of the said tube is also the anode resistor of a tube 37, the control-grid circuit of which has supplied to it the second triangular voltage shown in Fig. 18, which is derived from the cathode resistor of tube 28. For the sake of completeness, it may be mentioned that the supply of the first triangular voltage to the control-grid circuit of tube 29, as well as the supply of the second triangular voltage to the control-grid circuit of tube 37, is effected in known manner via an RC-network having a time-constant such that peak detection occurs, so that the peaks of the triangular voltages are located on a fixed level substantially equal to the cathode potentials of the tubes 29 and 37.

Set up across the anode resistor 36 of the two tubes 35 and 37, again apart from polarity and amplification, is a voltage corresponding to the sum of the voltages shown in Figs. 17 and 18. The second sum voltage is indicated by the full line in Fig. 19, in which the first sum voltage of Fig. 15 is shown again, i. e. by means of a dotted line.

An electronic switch is provided between the anodes of the tubes 26, 29 and the anodes of the tubes 35, 37. Said electronic switch comprises the series-combination of a diode 38, the cathode of which is connected to the resistor 30, a resistor 39, an equivalent resistor 40, and a diode 41, the cathode of which is connected to the resistor 36. The junction point of the resistors 39 and 40 is connected by way of a resistor 42 to a potentiometer 43, which is connected parallel to an anode resistor 44 of a tube 45. The control grid of tube 45 is connected to a common cathode resistor 46 of two amplifiers 47 and 48, which in this case are incorporated in one tube. The first stepwise voltage of capacitor 25 is applied to the control grid of tube 48 and the second stepwise voltage of capacitor 34 is applied to the control grid of tube 47. Consequently, across the cathode resistor 46 is set up as a third sum voltage the sum of the first and second stepwise voltages of the shape indicated in full line in Fig. 20.

The third sum voltage is amplified by tube 45 and inverted in phase, part of the amplified sum voltage being derived from potentiometer 43. The potentiometer 43 is so adjusted that at the moments at which the first and second sum voltages of Fig. 19 have the same amplitude, as indicated by dots in Fig. 19, the third sum voltage has the same amplitude value. This is indicated by the dotted line in Fig. 20, which for the sake of clarity includes the points corresponding to Fig. 19.

Figure 19:
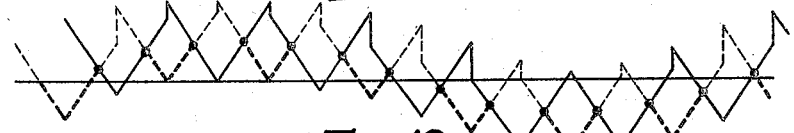
Figure 20:

It is noted again that in Fig. 19 as well as in Fig. 20 the polarity is indicated incorrectly, so that the described steps are not influenced thereby. At the junction point 49 of the resistors 39 and 40, the third sum voltage, indicated by the dotted line in Fig. 20, thus acts as a control voltage, so that the diodes 38 and 41 alternately become conductive, the alternation taking place exactly at the moments at which the first and second sum voltages have the same amplitudes.

Figure 21:

The output voltage at point 49 thus has the shape shown in Fig. 21. The output voltage, after being amplified in an amplifier 50, is supplied via the conductors 11 to the driving means for the chisel 10 of Fig. 1.

As may appear from a comparison between Figs. 21 and 12, the penetration depth of the chisel corresponding to the lower points of the curve shown in Fig. 21 has the same variation as that of the electric modulating voltage shown in Fig. 12. The deepest points of penetration of the chisel relatively exhibit a constant time-interval, which corresponds to an equidistant location with a uniform movement of the drums 1 and 2 shown in Fig. 1. The speed of the chisel is constant upon penetrating the plate and equal to that upon withdrawing from the plate.

If the frequency of the sinusoidal alternation shown in Fig. 4 is, for example, 400 cycles per second, the chisel also produces 400 points per second.

Referring to the shape of chisel shown in Figs. 2a and 2b, it is necessary to ensure that the angle α in Fig. 2a is at the most equal to the slope which the chisel performs under control of the voltage of Fig. 2l upon cutting into the plate and upon withdrawing from the plate, since otherwise the side 51 of the chisel of Fig. 2a abuts with the material of the plate.

If little holes are to be cut in the material which in plan view have a square section, the angle α in the sectional view of Fig. 2a must be equal to the angle β in the sectional view of Fig. 2b.

While the invention has been described by means of a specific example and in a specific embodiment, I do not wish to be limited thereto, for obvious modifications will occur to those skilled in the art without departing from the spirit and scope of the invention.

What is claimed is:

1. Apparatus for engraving a body of material in accordance with a predetermined pattern comprising a pattern forming means, means for producing a first voltage of triangular waveform having a frequency equal to one-half the fundamental frequency of operation of said pattern forming means, means for deriving a modulating voltage dependent upon the configuration of said predetermined pattern, means coupled to said last-mentioned means for deriving from said modulating voltage a first voltage of stepwise waveform having an amplitude equal to the amplitude of said modulating voltage occurring at each amplitude peak of said first voltage of triangular waveform, means connected for adding said first voltage of triangular waveform to said first voltage of stepwise waveform to produce a resultant first sum voltage, means for producing a second voltage of triangular waveform having a frequency equal to one-half said fundamental frequency, said second voltage of triangular waveform being electrically phase opposed to said first voltage of triangular waveform, means connected for deriving from said modulating voltage a second voltage of stepwise waveform having an amplitude equal to the amplitude of said modulating voltage occurring at each amplitude peak of said second voltage of triangular waveform, means connected for adding said second voltage of triangular waveform to said second voltage of stepwise waveform to produce a resultant second sum voltage, means connected for adding said first and second voltages of stepwise waveform to produce a resultant third sum voltage, switching means controlled by said third sum voltage having an input and an output, means for applying said first and second sum voltages to the input of said switching means, means for controlling the operation of said pattern forming means, and means for coupling the output of said switching means to said operation controlling means whereby the penetration depth of said pattern forming means varies as a function of the amplitude of said modulating voltage.

2. Apparatus for engraving a body of material in accordance with a predetermined pattern comprising a pattern forming means, means for producing a first voltage of triangular waveform having a frequency equal to one-half the fundamental frequency of operation of said pattern forming means, means for deriving a modulating voltage dependent upon the configuration of said predetermined pattern, means coupled to said last-mentioned means for deriving from said modulating voltage a first voltage of stepwise waveform having an amplitude equal to the amplitude of said modulating voltage occurring at each amplitude peak of said first voltage of triangular waveform, means connected for adding said first voltage of triangular waveform to said first voltage of stepwise waveform to produce a resultant first sum voltage, means for producing a second voltage of triangular waveform having a frequency equal to one-half said fundamental frequency, said second voltage of triangular waveform being electrically phase opposed to said first voltage of triangular waveform, means connected for deriving from said modulating voltage a second voltage of stepwise waveform having an amplitude equal to the amplitude of said modulating voltage occurring at each amplitude peak of said second voltage of triangular waveform, means connected for adding said second voltage of triangular waveform to said second voltage of stepwise waveform to produce a resultant second sum voltage, means connected for adding said first and second voltages of stepwise waveform to produce a resultant third sum voltage, means connected for controlling the amplitude of said third sum voltage in accordance with the amplitudes of said first and second sum voltages to maintain the amplitude of said third sum voltage equal to the amplitudes of said first and second sum voltages when the said last-mentioned amplitudes are equal, switching means controlled by said third sum voltage having an input and an output, means for applying said first and second sum voltages to the input of said switching means, means for controlling the operation of said pattern forming means, and means for coupling the output of said switching means to said operation controlling means whereby the penetration depth of said pattern forming means varies as a function of the amplitude of said modulating voltage.

3. Apparatus for engraving a body of material in accordance with a predetermined pattern comprising means for supporting said predetermined pattern in substantially cylindrical form, means for supporting said body of material in substantially cylindrical form in spaced relation from said predetermined pattern and on a common axis therewith, means for rotating said predetermined pattern and said body of material coaxially in the same sense and at the same speed in a manner whereby said predetermined pattern and said body of material perform opposite translations along said common axis, a pattern forming means positioned in operative relation to said body of material, means for producing a first voltage of triangular waveform having a frequency equal to one-half the fundamental frequency of operation of said pattern forming means including frequency generating means coupled to said rotating means, means for deriving a modulating voltage dependent upon the configuration of said predetermined pattern positioned in operative relation to the said pattern, means coupled to said last-mentioned means for deriving from said modulating voltage a first voltage of stepwise waveform having an ampltiude equal to the amplitude of said modulating voltage occurring at each amplitude peak of said first voltage of triangular waveform, means connected for adding said first voltage of triangular waveform to said first voltage of stepwise waveform to produce a resultant first sum voltage, means for producing a second voltage of triangular waveform having a frequency equal to one-half said fundamental frequency, said second voltage of triangular waveform being electrically phase opposed to said first voltage of triangular waveform, means connected for deriving from said modulating voltage a second voltage of stepwise waveform having an amplitude equal to the amplitude of said modulating voltage occurring at each amplitude peak of said second voltage of triangular waveform, means connected for adding said second voltage of triangular waveform to said second voltage of stepwise waveform to produce a resultant second sum voltage, means connected for adding said first and second voltages of stepwise waveform to produce a resultant third sum voltage, means connected for controlling the amplitude of said third sum voltage in accordance with the amplitudes of said first and second sum voltages to maintain the amplitude of said third sum voltage equal to the amplitudes of said first and second sum voltages when the said last-mentioned amplitudes are equal, switching means controlled by said third sum voltage having an input and an output, means for applying said first and second sum voltages to the input of said switching means, means for controlling the operation of said pattern forming means, and means for coupling the output of said switching means to said operation controlling means whereby the penetration depth of said pattern forming means varies as a function of the amplitude of said modulating voltage.

4. Apparatus for engraving a body of material in accordance with a predetermined pattern comprising a pattern forming means, means for producing an alternating voltage having a frequency equal to the fundamental frequency of operation of said pattern forming means, means connected for deriving from said alternating voltage a first series of pulses having a repetition frequency equal to one-half said fundamental frequency, means connected for deriving from said alternating voltage a second series of pulses having a repetition frequency equal to one-half said fundamental frequency, said second series of pulses being electrically phase opposed to said first series of pulses, means for producing a first voltage of triangular waveform having a frequency equal to one-half said fundamental frequency, said first voltage of triangular waveform having amplitude peaks which coincide in occurrence with the leading edges of the pulses of said first series of pulses, means for producing a second voltage of triangular waveform having a frequency equal to one-half said fundamental frequency, said second voltage of triangular waveform having amplitude peaks which coincide in occurrence with the leading edges of the pulses of said second series of pulses, means for deriving a modulating voltage dependent upon the configuration of said predetermined pattern, means coupled to said last-mentioned means for deriving from said modulating voltage a first voltage of stepwise waveform comprising a first clamping circuit, means for applying said modulating voltage to said first clamping circuit, means for applying said first series of pulses to said first clamping circuit and means for deriving said first voltage of stepwise waveform from the output of said first clamping circuit, said first voltage of stepwise waveform having an amplitude equal to the amplitude of said modulating voltage occurring at each amplitude peak of said first voltage of triangular waveform, means connected for deriving from said modulating voltage a second voltage of stepwise waveform comprising a second clamping circuit, means for applying said modulating voltage to said second clamping circuit, means for applying said second series of pulses to said second clamping circuit and means for deriving said second voltage of stepwise waveform from the output of said second clamping circuit, said second voltage of stepwise waveform having an amplitude equal to the amplitude of said modulating voltage occurring at each amplitude peak of said second voltage of triangular waveform, means for adding said first voltage of triangular waveform to said first voltage of stepwise waveform to produce a resultant first sum voltage, said last-mentioned means having an input coupled to the output of said means for producing a first voltage of triangular waveform and the output of said first clamping circuit, means for adding said second voltage of triangular waveform to said second voltage of stepwise waveform to produce a second sum voltage, said last-mentioned means having an input coupled to the output of said means for producing a second voltage of triangular waveform and the output of said second clamping circuit, means connected for adding said first and second voltages of stepwise waveform to produce a resultant third sum voltage, means connected for controlling the amplitude of said third sum voltage in accordance with the amplitudes of said first and second sum voltages to maintain the amplitude of said third sum voltage equal to the amplitudes of said first and second sum voltages when the said last-mentioned amplitudes are equal, switching means controlled by said third sum voltage having an input and an output, means for applying said first and second sum voltages to the input of said switching means, means for controlling the operation of said pattern forming means, and means for coupling the output of said switching means to said operation controlling means whereby the penetration depth of said pattern forming means varies as a function of the amplitude of said modulating voltage.

References Cited in the file of this patent

UNITED STATES PATENTS

| | | |
|---|---|---|
| 2,092,765 | Losier | Sept. 14, 1937 |
| 2,312,042 | Losier | Feb. 23, 1943 |